May 29, 1934. C. B. HILL 1,960,704
FEED MIXING MACHINE
Filed Sept. 24, 1931 3 Sheets-Sheet 3
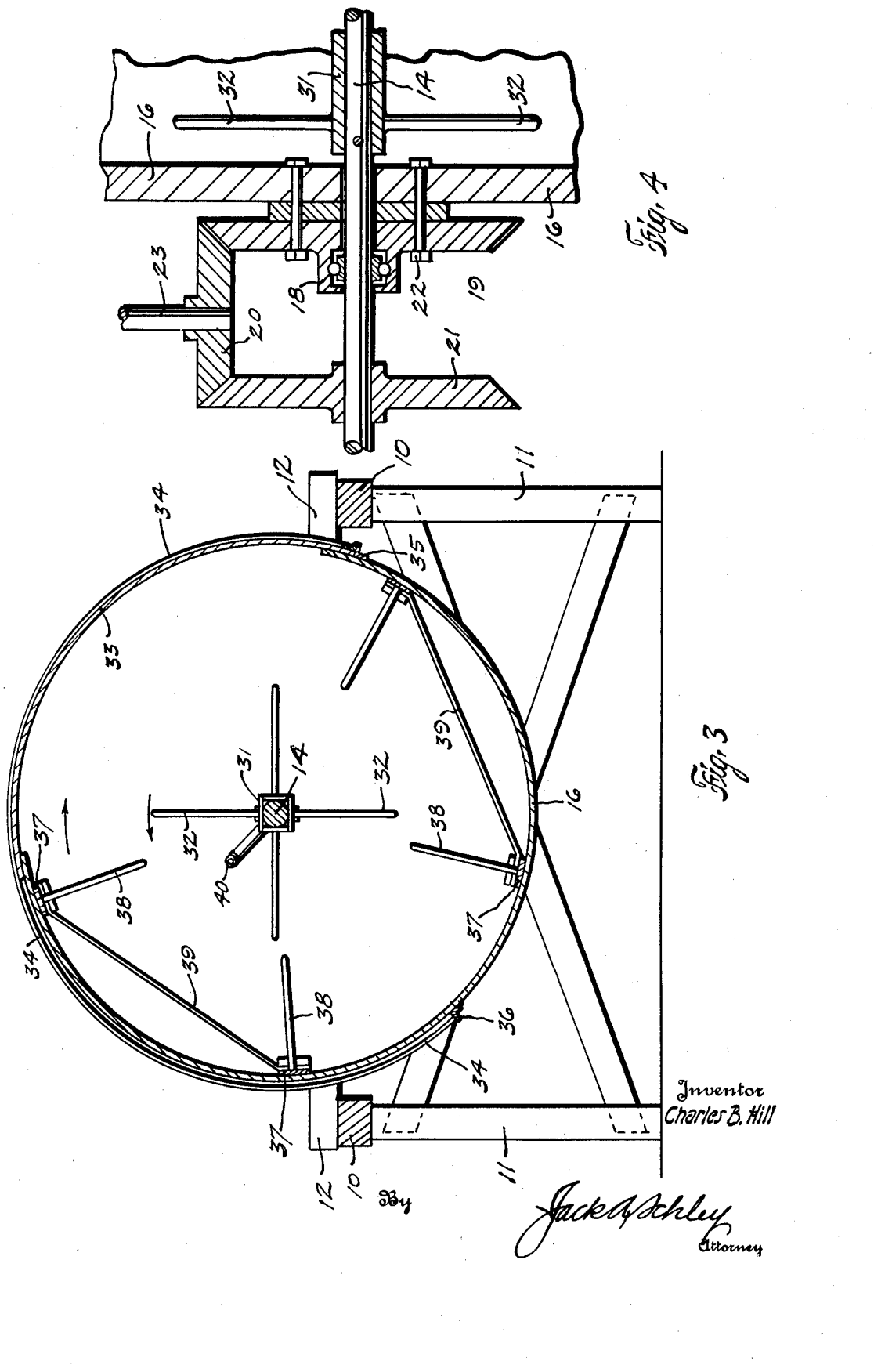

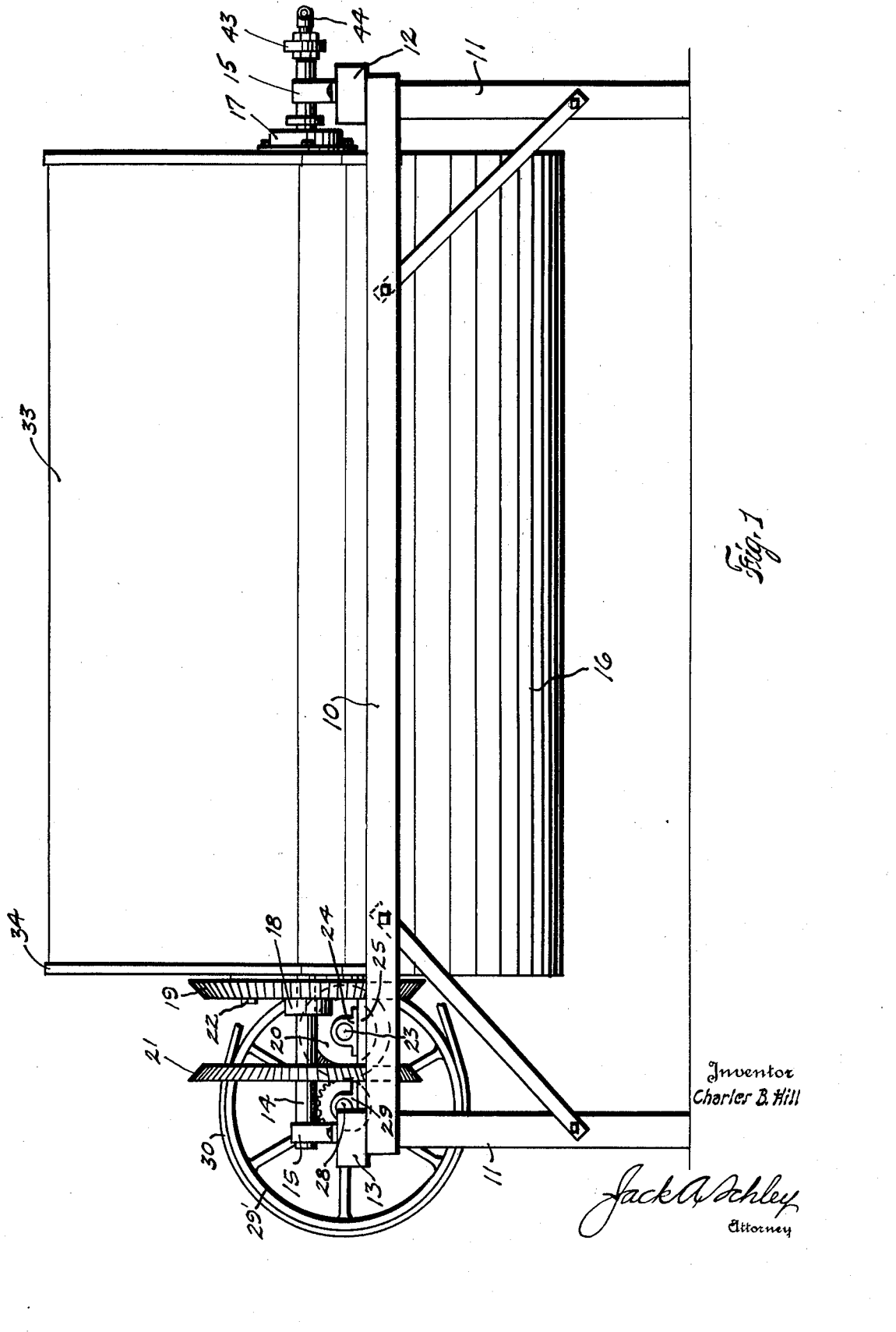

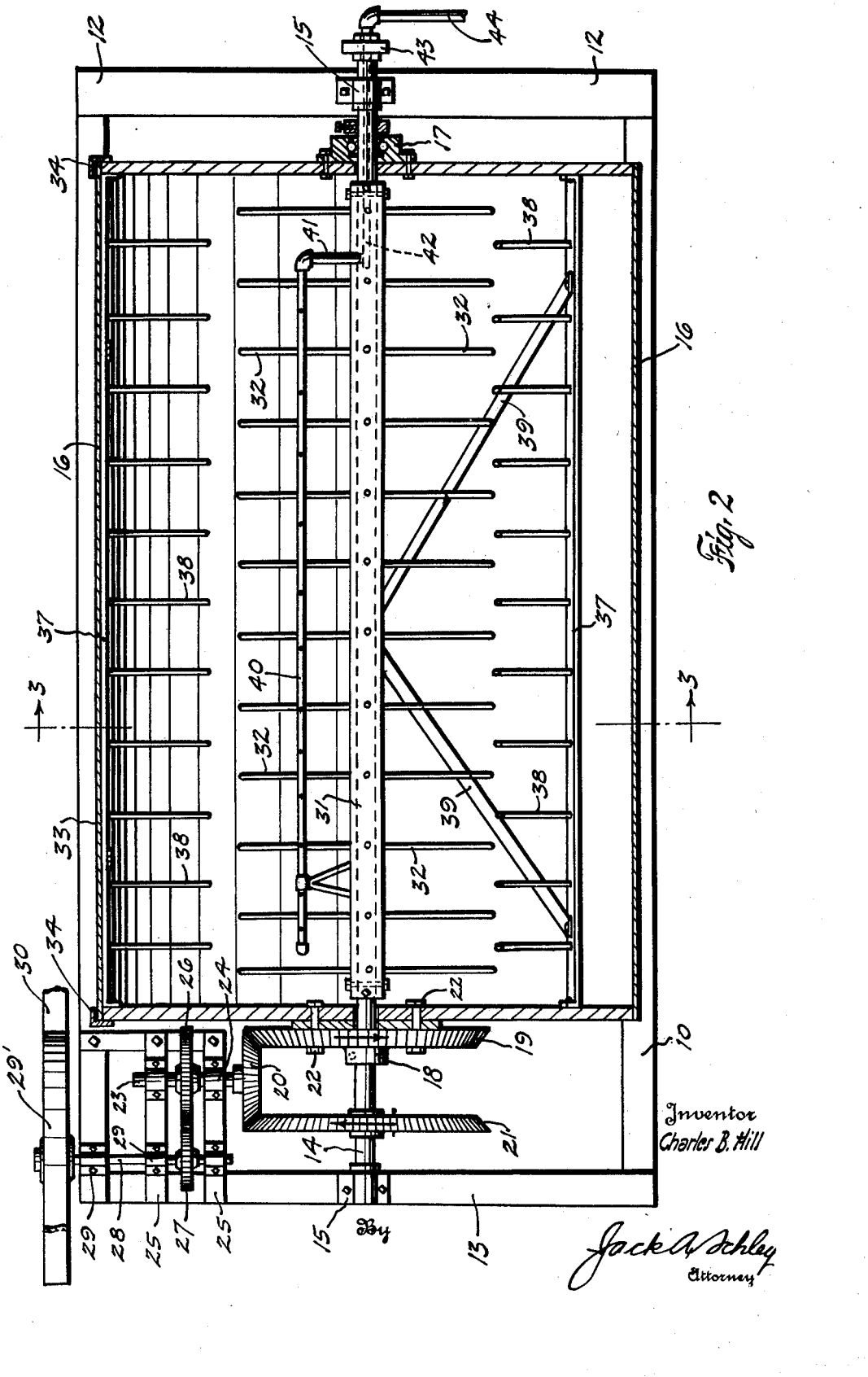

Patented May 29, 1934

1,960,704

UNITED STATES PATENT OFFICE 1,960,704

FEED MIXING MACHINE

Charles B. Hill, Dallas, Tex.

Application September 24, 1931, Serial No. 564,787

4 Claims. (Cl. 259—85)

This invention relates to new and useful improvements in feed mixing machines.

One object of the invention is to provide an improved mixing machine of the revolving drum type whereby feed may be thoroughly mixed, either wet or dry.

A particular object of the invention is to provide a mixing drum in connection with a central beater so arranged as to pick up the mixture on one side of the drum and to permit it to fall on the other side of the drum, whereby a reverse turn is given to the mixture, which makes for better mixing and assures an even distribution of the materials being mixed.

A further object of the invention is to provide a sprinkling head within the drum, whereby a liquid may be evenly distributed to the mixture.

A construction designed to carry out the invention will be hereinafter described together with other features of the invention.

The invention will be more readily understood from a reading of the following specification and by reference to the accompanying drawings in which an example of the invention is shown, and wherein:

Figure 1 is a side elevation of a mixing machine constructed in accordance with the invention, Figure 2 is a longitudinal vertical sectional view of the same, Figure 3 is a transverse vertical sectional view taken on the line 3—3 of Figure 2, and Figure 4 is a detail of one of the mountings for the drum.

In the drawings the numeral 10 designates a supporting frame which includes legs or standards 11 and cross bars 12 and 13 at the ends of the frame. A central longitudinal shaft 14 is journaled in bearing boxes 15 carried by the members 12 and 13 and an elongated cylindrical drum 16 is mounted to revolve on said shaft. In order to support the drum I mount a ball bearing box 17 at one end and provide a ball bearing mounting in the hub 18 of a beveled gear 19 at the other end of the drum. By this arrangement the drum is free to revolve in one direction, while the shaft 14 may be revolved in an opposite direction.

For revolving the drum and shaft I provide a beveled pinion 20 which meshes at one side with the gear 19 and on the opposite side with a beveled gear 21, suitably fastened on the shaft 14. The gear 19 is fastened to one end of the drum by bolts 22. The pinion 20 is mounted on a shaft 23 in bearing boxes 24 carried by cross bars 25, as is shown in Figure 1. A spur gear 26 is fastened on the shaft 23 between the boxes 24 and is driven by a spur pinion 27 fastened on a drive shaft 28 which is mounted in bearing boxes 29 on the cross bars. The shaft 28 is driven by a pulley 29', which in turn is driven by a belt 30 from a suitable motor or other source (not shown).

On the shaft 14 within the drum is fastened a sleeve 31. Fingers or beater rods 32 fastened in the sleeve extend radially in spaced order. It will be noted that the beaters extend at right angles to each other and are equally spaced. By reason of the gearing the beaters are revolved in an opposite direction from the drum.

One side of the drum is made into a longitudinal closure 33 and is mounted in angular channels 34 at each end of the drum, which channels are connected by longitudinal stops 35 and 36. When the door is closed it rests upon the stop 35 and when opened rests upon the stop 36. Beater head bars 37 are secured longitudinally of the drum and suitably spaced apart; however the door section 33 which occupies a goodly portion of one side of the drum is free from beaters. Beater fingers or rods 38, suitably fastened in the head bars, extend radially into the drum in staggered relation to the fingers 32, but terminate short of said last named fingers. In order to stiffen the drum longitudinally and prevent twisting, brace bars 39 extend from the end portions of one bar 37 to the center of the next bar.

When the drum 16 is revolved in a clockwise direction (Figure 3), the beater fingers 32 will be revolved in a counterclockwise direction. The fingers 38 will pick up the ingredients to be mixed and tend to carry said ingredients around opposite to the drum, but as the material is carried over the top center it will have two actions. Where the unobstructed side occupied by the door 33 is in advance of the top center, the material will fall down without being disturbed except for the fingers 32, but whenever the fingers 38 are on the falling side the material will be caught thereby and a reverse agitation given. This is very important as it makes for a much more thorough mixing of the ingredients.

Where it is desired to supply a liquid, such as water, syrup, or the like, a tubular spray head 40 is mounted in the drum and connected with a pipe arm 41. The pipe arm connects with a passage 42 extending axially of the shaft 15 and connected by a suitable union 43 with a spray pipe 44. I have found that materials may be more evenly and quickly mixed with this arrangement than by other arrangements. The unobstructed inner side of the drum is a very essential and useful feature.

Various changes in the size and shape of the different parts, as well as modifications and alterations, may be made within the scope of the appended claims.

Having illustrated and described a preferred form of the invention, what I claim, is:

1. A feed mixing machine including, a support, a longitudinal horizontal beatershaft mounted to revolve on said support, a revolving drum disposed longitudinally of said shaft and surrounding the same, means for revolving the drum and shaft in opposite directions, beater fingers mounted on the shaft radially within the drum, and a plurality of beater fingers mounted radially in spaced order on a portion of the inner surface of the drum and having their ends terminating adjacent the ends of the fingers of the shaft and receiving the material from the beater fingers on the shaft, a substantial portion of the inner surface of the drum being free from beaters, whereby materials agitated by said fingers may fall circumferentially on that side of the drum without obstruction by the shaft fingers so as to reverse the mixing action.

2. A feed mixing machine including, a support, a longitudinal horizontal beater shaft mounted to revolve on said support, a revolving drum disposed longitudinally of said shaft and surrounding the same, means for revolving the drum and shaft in opposite directions, beater fingers mounted on the shaft radially within the drum, and a plurality of beater fingers mounted radially in spaced order on a portion of the inner surface of the drum and having their ends terminating adjacent the ends of the fingers of the shaft and receiving the material from the beater fingers on the shaft, a portion of the inner surface of the drum being of greater circumferential area than the individual spaces between the beaters and also being free from beaters and unobstructed, whereby materials may fall circumferentially, on that side of the drum without obstruction.

3. A feed mixing machine including, a support, a longitudinal horizontal beater shaft mounted to revolve on said support, a revolving drum disposed longitudinally of said shaft and surrounding the same, means for revolving the drum and shaft in opposite directions, spaced bars extending longitudinally on the inner surface of the drum, diagonal braces extending from one bar to the next bar, spaced beater fingers extending from the bars radially within the drum and spaced longitudinally of the bars, and beater fingers extending radially from the shaft.

4. A feed mixing machine including, a support, a longitudinal horizontal beater shaft mounted to revolve on said support, a revolving drum disposed longitudinally of said shaft and surrounding the same, means for revolving the drum and shaft in opposite directions, a plurality of beater fingers mounted radially on the inner surface of the drum and unequally spaced on said surface, whereby a major portion of the surface is free from beaters, and radial beater fingers extending from the shaft and spaced equally circumferentially of said shaft and having their ends terminating adjacent the ends of the fingers on the inner surface of the drum.

CHARLES B. HILL.